Dec. 30, 1969 J. A. DRAGHI Re. 26,747

CENTER PUSHBUTTON TIMER

Original Filed May 26, 1966

INVENTOR
JAMES A. DRAGHI

BY Lindsey, Prutzman and Hayes

ATTORNEYS

United States Patent Office

Re. 26,747
Reissued Dec. 30, 1969

26,747
CENTER PUSHBUTTON TIMER

James A. Draghi, Manchester, Conn., assignor to M. H. Rhodes, Inc., Hartford, Conn., a corporation of Delaware Original No. 3,385,115, dated May 28, 1968, Ser. No. 553,104, May 26, 1966. Application for reissue Dec. 3, 1968, Ser. No. 791,816
Int. Cl. F16h 5/76
U.S. Cl. 74—3.54 6 Claims

Matter enclosed in heavy brackets [ ] appears in the original patent but forms no part of this reissue specification; matter printed in italics indicates the additions made by reissue.

*ABSTRACT OF THE DISCLOSURE*

*The timer of this invention includes a timing means setting shaft, a timing release shaft, a pushbutton, and a lever having a portion positioned radially outwardly of the setting shaft for moving the release shaft upon actuation of the pushbutton.*

This invention relates to timers which are manually windable and settable for controlling a variety of timed operations and has as a primary object the provision of an improved low cost timer incorporating a center pushbutton release normally associated with expensive, sophisticated timing mechanisms.

Another object of the invention is to provide such a timer or simplified construction which is particularly suited for quick and easy installation on a variety of equipment for providing time controlled operations.

A further object of the invention is to provide an improved push-button timing release which is readily incorporated in both new and existing timers.

Another object of the invention is to provide an improved timer of the above described type which is convenient and economical to manufacture and assemble, simple to use, and durable for reliable operation over a long service life.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

Figure 1:
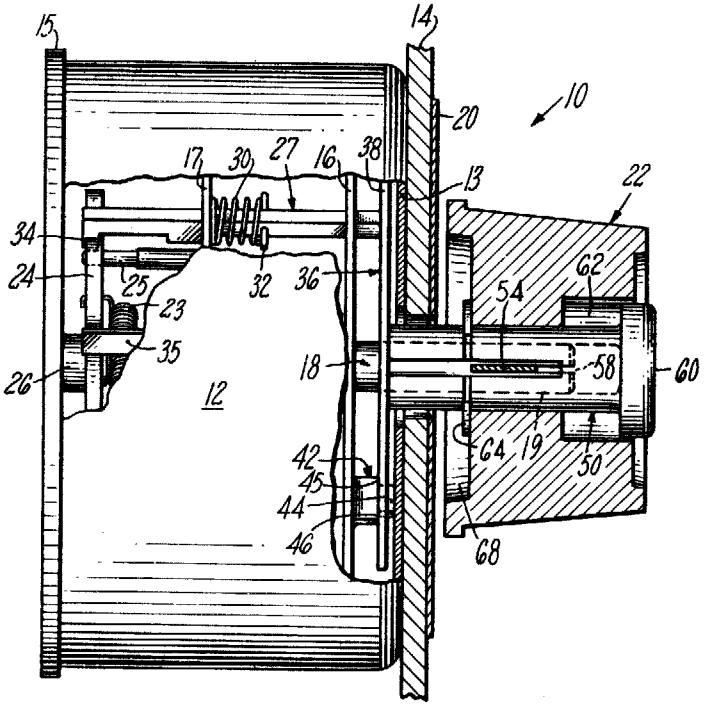
FIG. 1 is a side view, partly in section and partly broken away, showing a timer constructed in accordance with the present invention.
Figure 2:
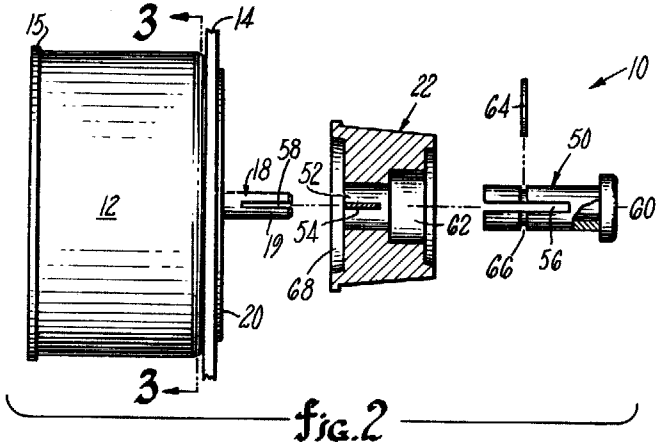
FIG. 2 is a partially exploded side view, partly in section and partly broken away, showing assembly details of the timer of FIG, 1 on a reduced scale.
Figure 3:
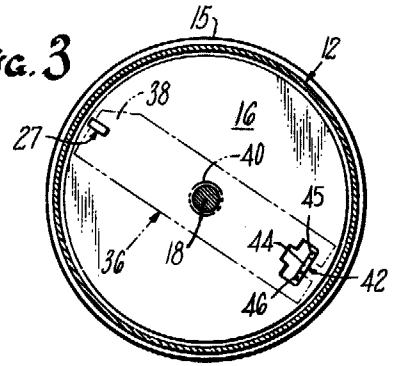
FIG. 3 is a section view taken generally along the 3—3 of FIG. 2 and showing, in broken lines, an actuating lever incorporated in the present invention.
Figure 4:
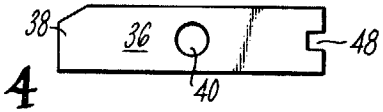
FIG. 4 is a plan view of the actuating lever.

Referring now to the drawing in detail, a preset timer 10 is shown including a cup-shaped metal casing 12 having a front wall 13 screw mounted, e.g., to a rear face of a base plate 14 of an associated device, not shown. The back of the casing 12 is closed by a rear wall 15 to provide a complete enclosure for the operating parts of the timer which are supported on a fixed frame within the casing 12. The frame includes front and back plates 16 and 17 which rotatably support a central setting shaft 18. The setting shaft 18 extends forwardly from within the casing 12 through aligned central openings in its front wall 13 and the base plate 14 to provide an outwardly projecting forward end portion 19 which passes through a centrally apertured dial 20 mounted on a front face of the base plate 14.

To operate the setting shaft 18, an actuator is provided including a knob 22 mounted as described more specifically below on the forward end portion 19, and an indicator or pointer, not shown, is provided on the operating knob 22 for setting a desired time cycle in reference to the dial 20.

Although the present invention is useful in a variety of conventional timers, the operating parts of the timer 10 are shown for illustrative purposes as being of the general type described in United States Patent No. 3,107,539 issued in the name of C. P. Cairelli on October 22, 1963, and entitled "Release Mechanism for Preset Timers." It will be understood that the operating parts include a timing mechanism supported on the frame and having a spring-driven clockwork connected to the setting shaft 18, the timing mechanism being constructed in accordance with conventional timer techniques. An operator can wind up the timing mechanism by turning the operating knob 22 a desired distance in one angular direction from a start or timed-out position, and the timing mechanism thereafter turns the setting shaft 18 and the operating knob 22 in the opposite angular direction during a period of running down to the timed-out position.

To control a desired operation by the timer 10, a control member or cam 24 is rotatably mounted on a lug 26, fixed to the rear wall 15 of the casing 12, for movement between an "off" position and an operating position for initiating a timed operation. As described in the referenced patent, the cam 24 is continuously biased toward its operating position by a tension spring, partially shown at 23. However, when the timer 10 is in its timed-out position, the cam 24 is maintained in its "off" position by a stud 25 movably mounted on the frame. Upon rotating the operating knob 22 to set the timer 10, the stud 25 is moved to condition the cam 24 to be spring actuated into its operating position, but the cam 24 will be temporarily maintained in its "off" position by a release shaft or latch 27.

The latch 27 serves to restrain the cam 24 against movement during the initial setting operation of the timed cycle and is supported on the front and back plates 16 and 17 for reciprocable sliding movement along an axis parallel to but spaced from the rotational axis of the setting shaft 18. A compression spring 30, seated between the back plate 17 and a projecting pin 32 carried by the latch 27, urges the latch forwardly into a latching position shown in the drawing wherein a finger 34, projecting from the rear end of the latch 27, is disposed in the path of movemnt of the cam 24 to engage the same and prevent it from moving into its operating position.

As described in the referenced patent, the clockwork is maintained inoperative during the initial setting operation by a cam-actuated pawl, partially shown at 35, which is designed to release a gear train of the clockwork when the cam 24 snaps into its operating position, thereby to synchronize the starting of the timed cycle and the timed operation.

To provide a low cost actuator having minimal space requiremnts for both new and existing timing modules wherein the release mechanism is radially offset from the setting shaft, a substantially flat lever 36 of thin cross-section is pivotally mounted between the front plate 16 and the front wall 13 of the casing 12 for operating the latch 27.

More specifically, the lever 36 extends diametrically across the casing 12 and is supported at one end for pivotal movement on the front plate 16 with an opposite swinging end 38 engaging the forward end of the latch 27. The setting shaft 18 extends through a center opening 40 in the lever 36, the opening 40 being of enlarged size to provide a peripheral clearance between the lever 36 and the setting shaft. The pivoted end of the lever 36 is supported on a projecting tab 42 bent outwardly from the front plate 16. The tab 42 has an end extension 44 of reduced cross section providing a pair of shoulders 45, 46 for supporting portions of the lever 36 on opposite lateral sides of a notch 48 formed in its pivoted ends. The end extension 44 of the tab 42 is received in the notch 48 with minimum clearance therebetween to minimize side-to-side movement of the lever 36 relative to the tab 42.

To provide a light finger-touch feature in a low cost time for use in appliances such as blenders and other equipment having need for time controlled operations which heretofore has been associated with high cost items, a hollow plunger 50 is coaxially mounted on the forward end portion 19 of the setting shaft 18 for cooperating with an intermediate portion of the lever 36. The plunger 50 is received in close fitting engagement within an axial passageway 52 formed in the operating knob 22 and is pushed rearwardly of the setting shaft 18 into abutment against portions of the lever 36 surrounding its center opening 40. A driving connection for transmitting rotary movement between the operating knob 22 and the setting shaft 18 is effected by a thin metal insert plate 54 pressed fit, e.g., in the operating knob 22 and extending across its passageway 52 so as to be received in aligned longitudinal slots 56 and 58 respectively formed in the plunger 50 and the forward end portion 19 of the drive shaft 18.

By virtue of this arrangement, a center push-button 60 is provided by a radial flange at the exposed outer end of the plunger 50 which requires only a light finger-touch to actuate the latch 27 due to the mechanical advantages effected by the lever 36. A preselected clearance is provided between the insert plate 54 and the inner end of the slots 56 such that upon depressing the push-button 60 it will move rearwardly into an enlarged cup-shaped central cavity 62 in the operating knob 22 a sufficient distance to permit the rear end of the plunger 50 to pivot the lever 36 and move the latch 27 rearwardly into a release position whereupon the spring biased cam 24 moves over the latching finger 34 and into its operating position to start the timed operation.

The pawl 35 is simultaneously actuated to release the gear train of the clockwork to start its movement, and when the clockwork is run down upon driving the setting shaft 18 and the operating knob 22 into the timed-out position, the above mentioned stud 25 will drive the cam 24 from its operating position to its "off" position causing the pawl 35 to lock the clockwork gear train against further movement. With the cam 24 in its "off" latching position to return the lever 36 and the plunger 50 into the position shown in FIG. 1.

The return travel of the plunger 50 is limited by a snap ring 64 retained in a groove 66 extending circumferentially around the plunger 50 and received for movement in a shallow annular recess 68 in the rear end of the operating knob 22. Upon forward movement of the plunger 50, the snap ring 64 will engage the operating knob 22 thereby to provide a positive stop limiting forward movement of the plunger 50, the lever 36 and the latch 27 and to condition the timer 10 for a repeat cycle.

It will be seen that the above described pivoted lever arrangement will permit the dimensions of the timer to remain unchanged regardless of whether it is incorporated in a new or existing timing module of the eccentric release type. Moreover, a timer constructed in accordance with the present invention requires only one hole in the mounting panel thereby to significantly facilitate installation. The timer is particularly suited for simple, low cost construction while providing a center push-button feature for light finger-touch operation.

As will be apparent to persons skilled in the art, various modifications and adaptations of the structure above described will become readily apparent without departure from the spirit and scope of the invention[, the scope of which is defined in the appended claims].

I claim:

1. A preset timer comprising a frame, timing means including a setting shaft supported on said frame and rotatable in one angular direction from an initial timed-out position to set a desired time cycle and rotatable in an opposite angular direction in a time controlled manner toward said timed-out position, a movable control member supported on said frame for controlling an operation to be timed, a timing release shaft supported for movement on said frame, sad release shaft positioned radially outwardly of the rotational axis of said setting shaft for releasably latching said control member, and means for operating said release shaft including an actuator coaxially mounted on one end of said setting shaft, and a lever [having one end] supported for [pivotal] movement on said frame and [an opposite] *having an* end disposed radially outwardly of said setting shaft in engagement with said release shaft, said lever being movable by said actuator for [releasing] *moving* said release shaft after the time cycle has been set.

2. The timer of claim 1 wherein said actuator includes an operating knob having an axial passageway therethrough mounted on said setting shaft for rotating the same, and a plunger received in said axial passageway of said operating knob and mounted [on said one end of said setting shaft] for coaxial reciprocable movement [thereon] *relative thereto,* said plunger having an exposed outer end providing a manually depressible center push-button in said operating knob and an opposite inner end in abutting engagement with [an intermediate] *a* portion of said lever for actuating the same.

3. The timer of claim 2 wherein said lever includes an opening intermediate its ends, said setting shaft extending through said opening, said inner end of said plunger being in abutting engagement with portions of said lever surrounding its said opening, and said opening being of enlarged size with respect to said setting shaft to effect a preselected peripheral clearance and unobstructed [pivotal] movement of said lever relative to said setting shaft for operating said release shaft upon movement of said plunger.

4. The timer of claim 2 wherein said release shaft is reciprocable along an axis of movement in parallel spaced relation to the rotational axis of said setting shaft, said release shaft being movable between a latching position restraining said control member against movement and a release position permitting movement of the same, and wherein biasing means are provided for continuously urging said release shaft toward said latching position and for maintaining it in engagement with [said opposite end of] said lever.

5. The timer of claim 4 further including a retaining member fixed to said plunger intermediate its said inner and outer ends and engageable with said operating knob to provide a positive stop limiting return travel of said plunger and said lever upon said release shaft being moved into its said latching position under the force of said biasing means.

6. The timer of claim 1 wherein said lever is a substantially flat plate of thin cross-section.

References Cited

The following references, cited by the Examiner, are of record in the patented file of this patent or the original patent.

UNITED STATES PATENTS 3,107,539 10/1963 Cairelli ---------- 74—3.54

MILTON KAUFMAN, Primary Examiner

U.S. Cl. X.R.

200—35